United States Patent
Deng et al.

(10) Patent No.: US 12,227,138 B2
(45) Date of Patent: Feb. 18, 2025

(54) VEHICLE SEATBACK HAVING ROTATABLE ARM ON BOLSTER

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/321,986

(22) Filed: May 23, 2023

(65) Prior Publication Data
US 2024/0391409 A1 Nov. 28, 2024

(51) Int. Cl.
*B60R 21/02* (2006.01)
*B60R 21/015* (2006.01)
*B60R 21/207* (2006.01)
*B60R 21/00* (2006.01)

(52) U.S. Cl.
CPC ........ *B60R 21/02* (2013.01); *B60R 21/01512* (2014.10); *B60R 21/207* (2013.01); *B60R 2021/0006* (2013.01); *B60R 2021/022* (2013.01)

(58) Field of Classification Search
CPC ...... B60R 2021/022; B60R 2021/0293; B60R 21/207
See application file for complete search history.

(56) References Cited

U.S. PATENT DOCUMENTS

| | | | |
|---|---|---|---|
| 3,623,768 A | 11/1971 | Capener et al. | |
| 5,492,361 A * | 2/1996 | Kim | B60R 21/207 280/730.2 |
| 8,474,862 B2 * | 7/2013 | Pursche | B60R 21/0134 297/452.41 |
| 8,602,449 B2 * | 12/2013 | Kojima | B60N 2/986 280/730.2 |
| 9,457,751 B1 * | 10/2016 | Stancato | B60N 2/42763 |
| 9,827,876 B2 * | 11/2017 | Madaras | B60R 21/04 |
| 9,896,007 B2 * | 2/2018 | Ohno | B60N 2/885 |

(Continued)

FOREIGN PATENT DOCUMENTS

| | | | | |
|---|---|---|---|---|
| DE | 102008043617 A1 * | 5/2010 | | B60N 2/0276 |
| DE | 102009047393 A1 * | 6/2011 | | B60N 2/42727 |

(Continued)

*Primary Examiner* — Nicole T Verley
(74) *Attorney, Agent, or Firm* — Frank A. MacKenzie; Brooks Kushman P.C.

(57) ABSTRACT

With reference to the Figures, wherein like numerals indicate like parts throughout the several views, a vehicle includes a vehicle seat that includes a seatback and a seat bottom that defines an occupant seating area. The seatback includes an inboard bolster and an outboard bolster spaced from the inboard bolster in a cross-seat direction with the occupant seating area between the inboard bolster and the outboard bolster. A arm is rotatably supported by the inboard bolster. The vehicle includes a computer that includes a processor and a memory storing instructions executable by the processor to detect an occupant in the occupant seating area and based on the detection of an occupant in the occupant seating area, rotate the arm toward the occupant seating area in response to detection of certain vehicle impacts.

15 Claims, 8 Drawing Sheets

(56) References Cited

U.S. PATENT DOCUMENTS

| | | | |
|---|---|---|---|
| 10,427,568 B2* | 10/2019 | Samain | B60N 2/7094 |
| 10,479,310 B2* | 11/2019 | Dry | B60N 2/79 |
| 10,596,993 B2* | 3/2020 | Dry | B60R 21/232 |
| 10,632,952 B2* | 4/2020 | Markusic | B60R 21/231 |
| 10,752,136 B2 | 8/2020 | Sugiyama | |
| 10,787,143 B2* | 9/2020 | Vo | G06K 19/06037 |
| 11,052,794 B2* | 7/2021 | Hunsaker | B60N 2/914 |
| 11,273,785 B1* | 3/2022 | Faruque | B60R 21/01554 |
| 2010/0283229 A1* | 11/2010 | Feller | B60N 2/986 296/65.01 |
| 2013/0169010 A1* | 7/2013 | Sugiyama | B60N 2/99 297/216.13 |
| 2015/0130237 A1 | 5/2015 | Takeuchi et al. | |
| 2016/0288668 A1* | 10/2016 | Cortney | B60N 2/0296 |
| 2016/0288751 A1* | 10/2016 | Stancato | B60R 21/01512 |
| 2016/0288752 A1* | 10/2016 | Stancato | B60R 21/01546 |
| 2018/0208084 A1* | 7/2018 | Patel | B60R 21/02 |
| 2019/0217805 A1* | 7/2019 | Dry | B60N 2/14 |
| 2021/0016693 A1* | 1/2021 | Line | B60R 21/207 |
| 2021/0122315 A1* | 4/2021 | Komarizadeh | B60R 21/02 |
| 2022/0097638 A1* | 3/2022 | Deng | B60N 2/79 |

FOREIGN PATENT DOCUMENTS

| | | | | |
|---|---|---|---|---|
| DE | 102012206426 A1 | * | 10/2013 | B60N 2/4235 |
| FR | 2910853 A1 | * | 7/2008 | B60N 2/0232 |
| FR | 2910855 A1 | * | 7/2008 | B60N 2/0232 |
| JP | 2007137129 A | | 6/2007 | |
| JP | 2008220640 A | | 9/2008 | |
| JP | 201057824 A | | 3/2010 | |
| JP | 2019059479 A | * | 4/2019 | B60N 2/2222 |
| JP | 6959558 B2 | * | 11/2021 | B60N 2/2222 |
| WO | 2013099705 A1 | | 7/2013 | |
| WO | WO-2015041288 A1 | * | 3/2015 | B60N 2/2222 |

* cited by examiner

VEHICLE SEATBACK HAVING ROTATABLE ARM ON BOLSTER

BACKGROUND

Vehicles may be subject to impact tests to test the movement of vehicle occupants. Such tests may be standardized by various governmental or industry organizations. Some test, for example, measure the movement of vehicle occupants during certain vehicle impacts that move the vehicle occupants in cross-vehicle directions. These tests include certain side impact tests and oblique impact tests.

As one example, the National Highway Traffic Safety Administration (NHTSA) sets forth a standardized test procedure for a side pole crash test, which is designed to simulate a vehicle experiencing certain side impacts with a pole. Another example that tests cross vehicle movement of the occupant is the European New Car Assessment Program (EuroNCAP). The Euro NCAP has certain side impact tests standardized to test the far side impact condition and evaluate occupant kinematics relative to other occupants.

DETAILED DESCRIPTION

Figure 1:
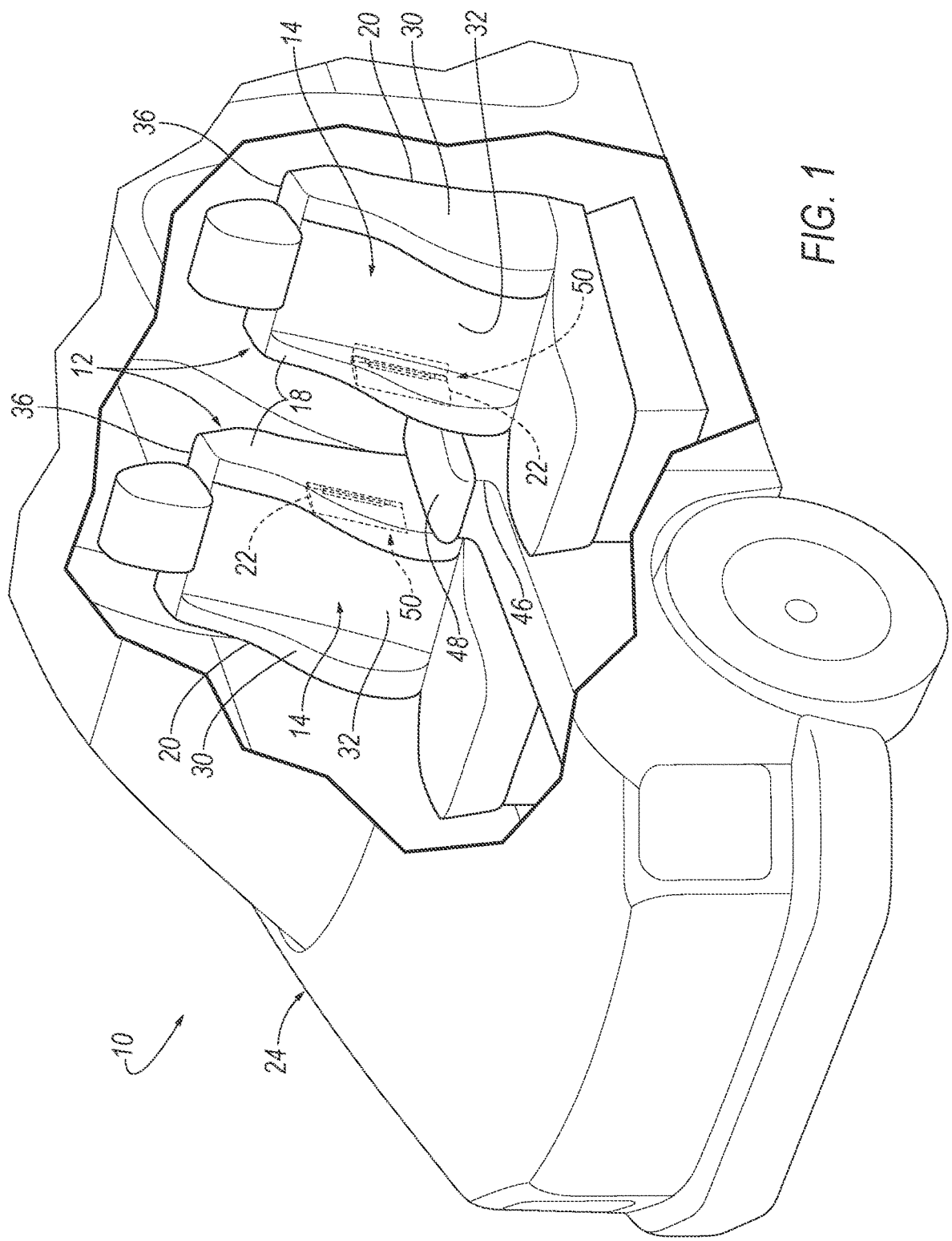
FIG. 1 is the perspective view of a vehicle having a vehicle seat and an arm assembly rotatable relative to the vehicle seat.

A vehicle includes a vehicle seat that includes a seatback that defines an occupant seating area. The seatback includes an inboard bolster and an outboard bolster spaced from the inboard bolster in a cross-seat direction with the occupant seating area between the inboard bolster and the outboard bolster. An arm is rotatably supported by the inboard bolster. The vehicle includes a computer that includes a processor and a memory storing instructions executable by the processor to detect an occupant in the occupant seating area and, based on the detection of an occupant in the occupant seating area, rotate the arm toward the occupant seating area in response to detection of certain vehicle impacts The inboard bolster may be elongated along an upright axis and the arm may be rotatable relative to the inboard bolster toward the occupant seating area about the upright axis. The arm may be elongated along the upright axis.

The vehicle may include an actuator supported by the inboard bolster and configured to rotate the arm toward the occupant seating area. The arm may be supported by the actuator. The actuator may be a pyrotechnic actuator.

The inboard bolster may include a frame and a covering. The arm may be supported by the frame between the frame and the covering. The arm may move the covering toward the occupant seating area when the arm rotates toward the occupant seating area. The vehicle may include an actuator supported by the frame and configured to rotate the arm toward the occupant seating area.

The vehicle may include a hinge between the arm and the inboard bolster.

The inboard bolster may be elongated along an upright axis and the arm may be elongated along the upright axis.

The memory may store instructions executable by the processor to, based on the detection of an occupant in the occupant seating area, rotate the arm toward the occupant seating area in response to detection of certain far-side vehicle impacts.

The vehicle may include a middle console adjacent the vehicle seat. The inboard bolster may be between the outboard bolster and the middle console. The vehicle may include a second vehicle seat. The middle console may be between the second vehicle seat and the inboard bolster.

The vehicle may include a second vehicle seat. The inboard bolster may be between the outboard bolster and the second vehicle seat.

The vehicle may include a second vehicle seat including a second vehicle seatback that defines a second occupant seating area. The second vehicle seatback may include a second inboard bolster and a second outboard bolster spaced from the second inboard bolster in a cross-seat direction of the second vehicle seat with the second occupant seating area between second inboard bolster and the second outboard bolster. A second arm may be rotatably supported by the inboard bolster. the memory storing instructions executable by the processor to detect an occupant in the second occupant seating area and, based on the detection of an occupant in the second occupant seating area, rotate the second arm toward the second occupant seating area in response to detection of certain vehicle impacts.

With reference to the Figures, wherein like numerals indicate like parts throughout the several views, a vehicle 10 includes a vehicle seat 12 that includes a seatback 14 that defines an occupant seating area 16. The seatback 14 includes an inboard bolster 18 and an outboard bolster 20 spaced from the inboard bolster 18 in a cross-seat direction with the occupant seating area 16 between the inboard bolster 18 and the outboard bolster 20. An arm 22 is rotatably supported by the inboard bolster 18. The vehicle 10 includes a computer 70 that includes a processor and a memory storing instructions executable by the processor to detect an occupant in the occupant seating area 16 and, based on the detection of an occupant in the occupant seating area 16, rotate the arm 22 toward the occupant seating area 16 in response to detection of certain vehicle impacts.

Since the memory stores instructions to rotate the arm 22 toward the occupant seating area 16 in response to detection of certain vehicle impacts, the arm 22 urges an occupant seated on the seatback 14 in the cross-seat direction toward the outboard bolster 20. As an example, the memory may store instructions to rotate the arm 22 toward the occupant seating area 16 in response to detection of certain vehicle side impacts.

With reference to FIG. 1, the vehicle 10 may be any type of passenger or commercial automobile such as a car, a truck, a sport utility vehicle, a crossover, a van, a minivan, a taxi, a bus, etc.

The vehicle 10 includes a body 24 defining a passenger cabin (not numbered) to house occupants, if any, of the vehicle 10. The body 24 may include a roof (not numbered) and a floor with the roof defining an upper boundary of the passenger cabin and the floor defining a lower boundary of the passenger cabin. The body 24 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10.

With reference to FIG. 1, the passenger cabin may include at least two vehicle seats 12 including a first vehicle seat 12 and a second vehicle seat 12 set forth above. The adjective "first" and "second" is used as an identifier to distinguish between two vehicle seats 12 of the vehicle 10 and does not indicate order or importance. Common numerals are used to identify common features of the first vehicle seat 12 and the second vehicle seat 12 in the Figures. The vehicle seats 12, e.g., the first vehicle seat 12 and the second vehicle seat 12, may be arranged as a driver seat and a passenger seat. The vehicle seats 12 may be supported by the vehicle floor, as shown in the example in the Figures. The vehicle seats 12 may be arranged in any suitable arrangement in the passenger cabin. As in the example shown in the Figures, one or more of the vehicle seats 12 may be at the front end of the passenger cabin, e.g., the driver seat and/or the passenger seat. In other examples, one or more of the vehicle seats 12 may be behind the front end of the passenger cabin, e.g., at the rear end of the passenger cabin. The vehicle seats 12 may be movable relative to the vehicle floor to various positions, e.g., movable fore-and-aft. The vehicle 10 may be of any suitable type, e.g., a bucket seat.

Each vehicle seat 12 includes the seatback 14 and a seat bottom 26. The seatback 14 may be supported by the seat bottom 26 and may be stationary or movable relative to the seat bottom 26. Specifically, the seatback 14 may be fixed relative to the seat bottom 26 in an upright position or moveable relative to the seat bottom 26 to the upright position. The upright position is a position of the seatback 14 that supports an occupant in a seated position. As an example, the seatback 14 in the upright position may be elongated within degrees of parallel to a vertical axis A1. In some examples, the seatback 14 is rotatable from the upright position to a reclined position in which the seatback 14 is elongated between degrees of parallel and horizontal. In examples including rows of seats, e.g., the rear row of seats, the seatback 14s of adjacent seats in the row are adjacent each other and arranged cross-vehicle.

The vehicle seats 12 each include an inboard side 28 and an outboard side 30 spaced from each other in the cross-seat direction, e.g., in a cross-vehicle direction when the seat is forward facing. The seatback 14 includes a front 32 extending from the inboard side 28 to the outboard side 30 and a rear 34 extending from the inboard side 28 to the outboard side 30. As shown in the Figures, when the seatback 14 is forward-facing in the upright position, the front 32 of the seatback 14 faces vehicle forward and the rear 34 of the seatback 14 faces vehicle rearward. The inboard side 28 is vehicle-inboard of the outboard side 30 when the seatback 14 is forward facing.

The seatback 14 and the seat bottom 26 define the occupant seating area 16. The occupant seating area 16 is in a seat-forward direction of the seatback 14 and above the seat bottom 26. Specifically, the seatback 14 defines the occupant seating area 16 between the inboard side 28 and the outboard side 30. The front 32 of the seatback 14 between the inboard side 28 and the outboard side 30 defines the occupant seating area 16. The occupant seating area 16 is the area occupied by an occupant when properly seated on the vehicle seat 12.

The seatback 14 includes a top 36 between the inboard side 28 and the outboard side 30. Specifically, the top 36 extends from the inboard side 28 to the outboard side 30. The seatback 14 is elongated from the seat bottom 26 to the top 36 of the seatback 14. In other words, as shown in the Figures, the top 36 may terminate at the inboard side 28 and the outboard side 30.

The seatback 14 may have bolsters, i.e., the inboard bolster 18 and the outboard bolster 20. The outboard bolster 20 is spaced from the inboard bolster 18 in the cross-seat direction. The occupant seating area 16 is between the inboard bolster 18 and the outboard bolster 20. The bolsters, e.g., the inboard bolster 18 and outboard bolster 20, are elongated, and specifically, are elongated along an upright axis A2 when the seatback 14 is in the upright position. The bolsters 18, 20 define cross-seat boundaries of the seatback 14, i.e., the seatback 14 terminates at the bolsters 18, 20. The bolsters 18, 20 may extend in a seat-forward direction relative to the occupant seating area 16, i.e., on opposite sides of the torso and shoulders of an occupant seated on the vehicle seat 12. The inboard bolster 18 is vehicle-inboard of the outboard bolster 20 when the seatback 14 is forward facing.

The seat 12 includes a frame 38 and a covering 40 supported by the frame 38. Specifically, the seatback 14 includes the frame 38, i.e., a seatback 14 frame 38, and the covering 40. The seat bottom 26 may also include the frame 38 and the covering 40. The frame 38 may include tubes, beams, etc. Specifically, the frame 38 includes a pair of upright frame members 42. The upright frame members 42 are spaced from each other, and the frame 38 includes at least one cross-beam 44 extending between the upright frame members 42. The frame 38, including the upright frame members 42, may be of any suitable metal (e.g., steel, aluminum, etc.), plastic material (e.g., carbon fiber reinforced plastic (CFRP), glass fiber-reinforced semi-finished thermoplastic composite (organosheet), etc.), etc. The covering 40 may include upholstery and padding. The upholstery may be cloth, leather, faux leather, or any other suitable material. The upholstery may be stitched in panels around the frame 38. The padding may be between the covering 40 and the frame 38 and may be foam or any other suitable material. The covering 40 conceals the arm 22 when the arm 22 is in an undeployed position and when the arm 22 is in a deployed position. The outboard bolster 20 and the inboard bolster 18 each include the frame 38 and the covering 40 supported on the frame 38. The extension of the bolsters 18, 20 relative to the occupant seating area 16 may be defined by the upright frame members 42 and/or the covering 40. In the example shown in the Figures, the size and shape of both the upright frame members 42 and the covering 40 form the bolsters.

As set forth above, the seatback 14, and specifically the frame 38, is elongated along the upright axis A2 when the seatback 14 is in the upright position. Specifically, the upright frame members 42 of the frame 38 are elongated along the upright axis A2 when the seatback 14 is in the upright position. As described above, in the upright position, the seat 12 may be occupied by an occupant and the seatback 14 supports the occupant in the seated position. The top 36 of the seatback 14 is above the seat bottom 26 in the upright position. In the examples shown in the Figures, the front seats are in the upright position.

The vehicle 10 may include a middle console 46 between the first vehicle seat 12 and the second vehicle seat 12. The middle console 46 may be on a longitudinal midline of the vehicle 10. With reference to the example shown in FIGS. 2A-2B the middle console 46 is adjacent the vehicle seat 12, i.e., with nothing between the middle console 46 and the vehicle seat 12.

The middle console 46 may be supported by the floor. Specifically, in such examples, the middle console 46 extends upwardly from the floor between the first vehicle seat 12 and the second vehicle seat 12. In such an example, the middle console 46 abuts the floor and may be connected to the floor, e.g., with fasteners such as threaded fasteners. The middle console 46 may be, for example, plastic such as acrylonitrile butadiene styrene (ABS), vinyl, etc. The middle console 46 may include a class-A surface exposed to the passenger cabin. A class-A surface is a finished surface free of unaesthetic blemishes and defects and exposed to view by a vehicle occupant seated in the vehicle 10. The middle console 46 may include cup holders and may support vehicle controls, e.g., a gear shifter, window controls, HVAC controls, multimedia controls, etc.

The middle console 46 may include an armrest 48. The armrest 48 is above the middle console 46 and, for example, may be supported by the middle console 46. The armrest 48 is designed to support the arm 22 of occupants of the vehicle seated in the vehicle seats 12. Specifically, the armrest 48 is sized, shaped, and positioned to support the arm 22 of the occupant. The armrest 48 may be upholstered, e.g., with a covering of vinyl, leather, etc.

Figure 2A:
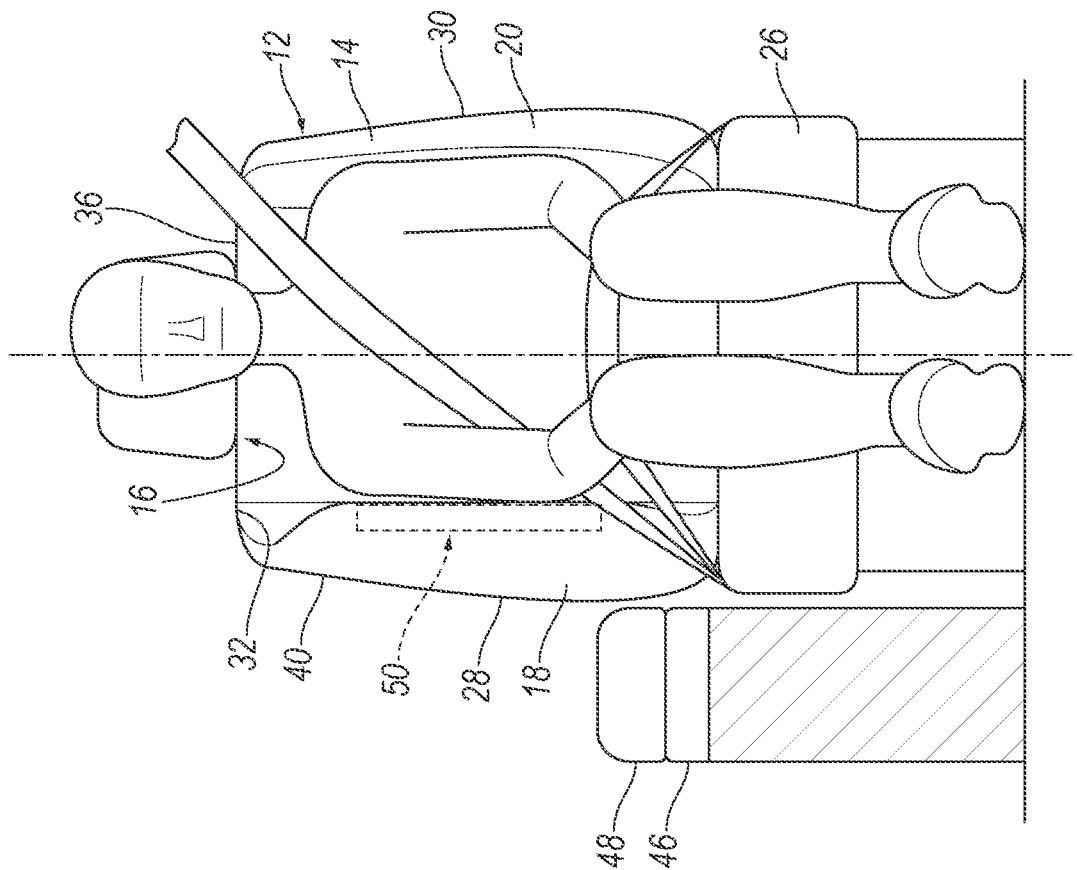
FIG. 2A is a front view of the vehicle seat and a middle console with the arm assembly in an undeployed position.
Figure 2B:
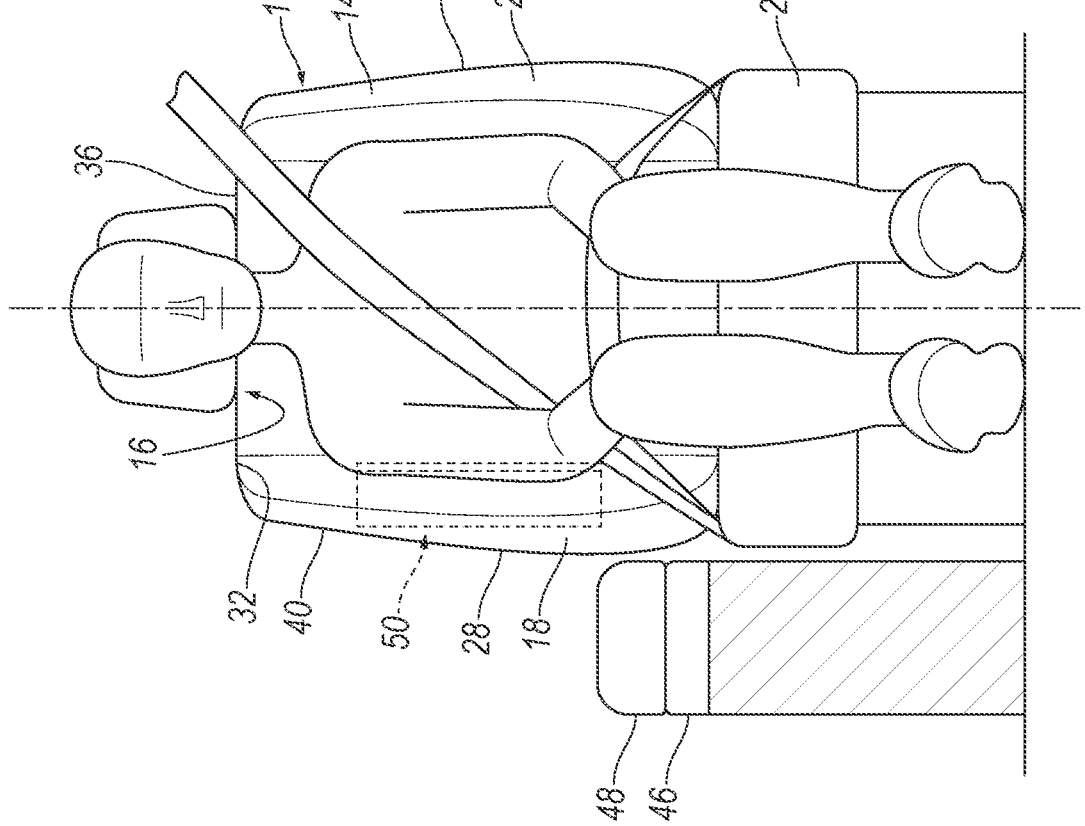
FIG. 2B is the view of FIG. 2A with the arm assembly in a deployed position.
Figure 3:
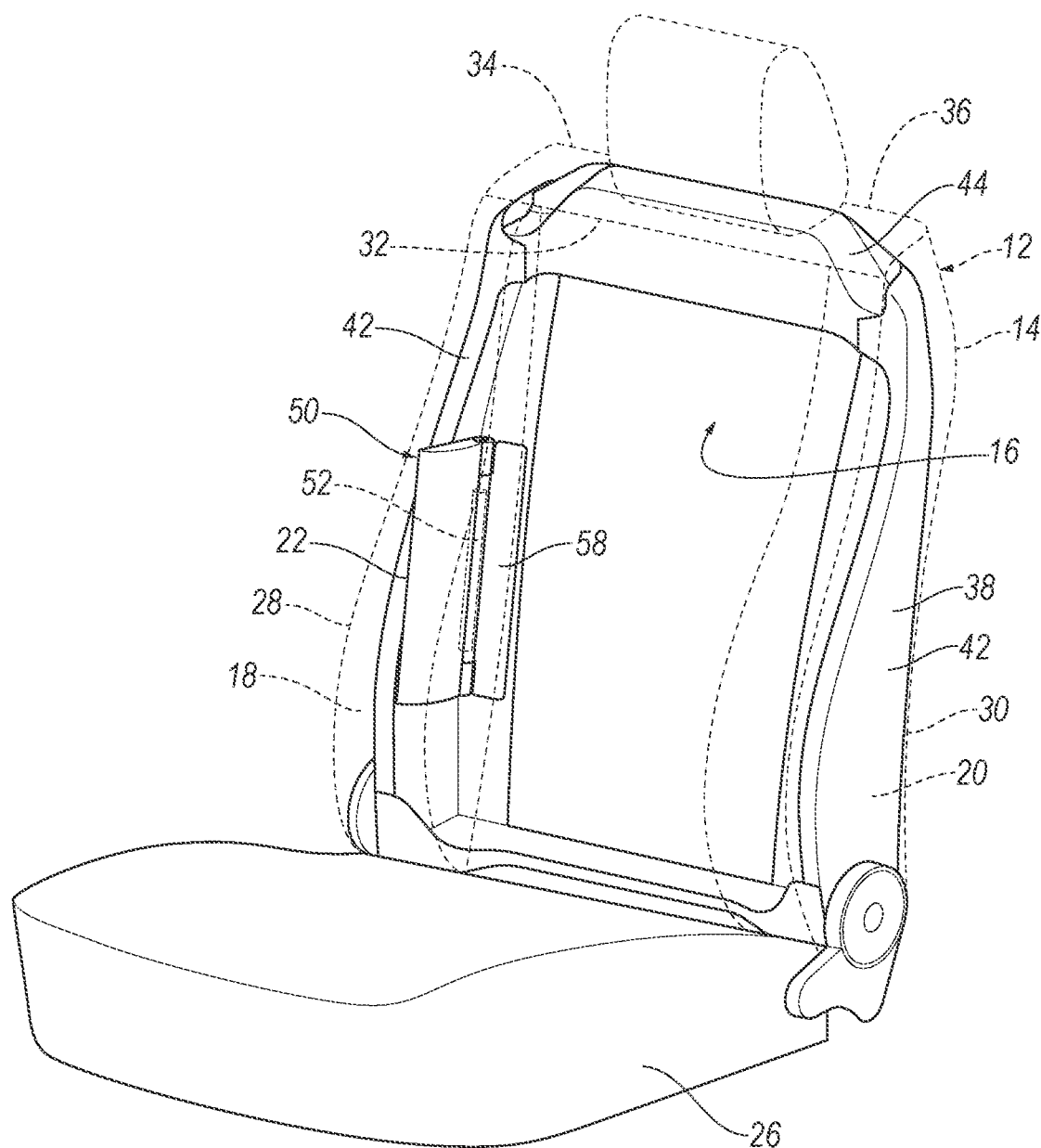
FIG. 3 is a perspective view of the vehicle seat with the arm assembly in the undeployed position.
Figure 4:
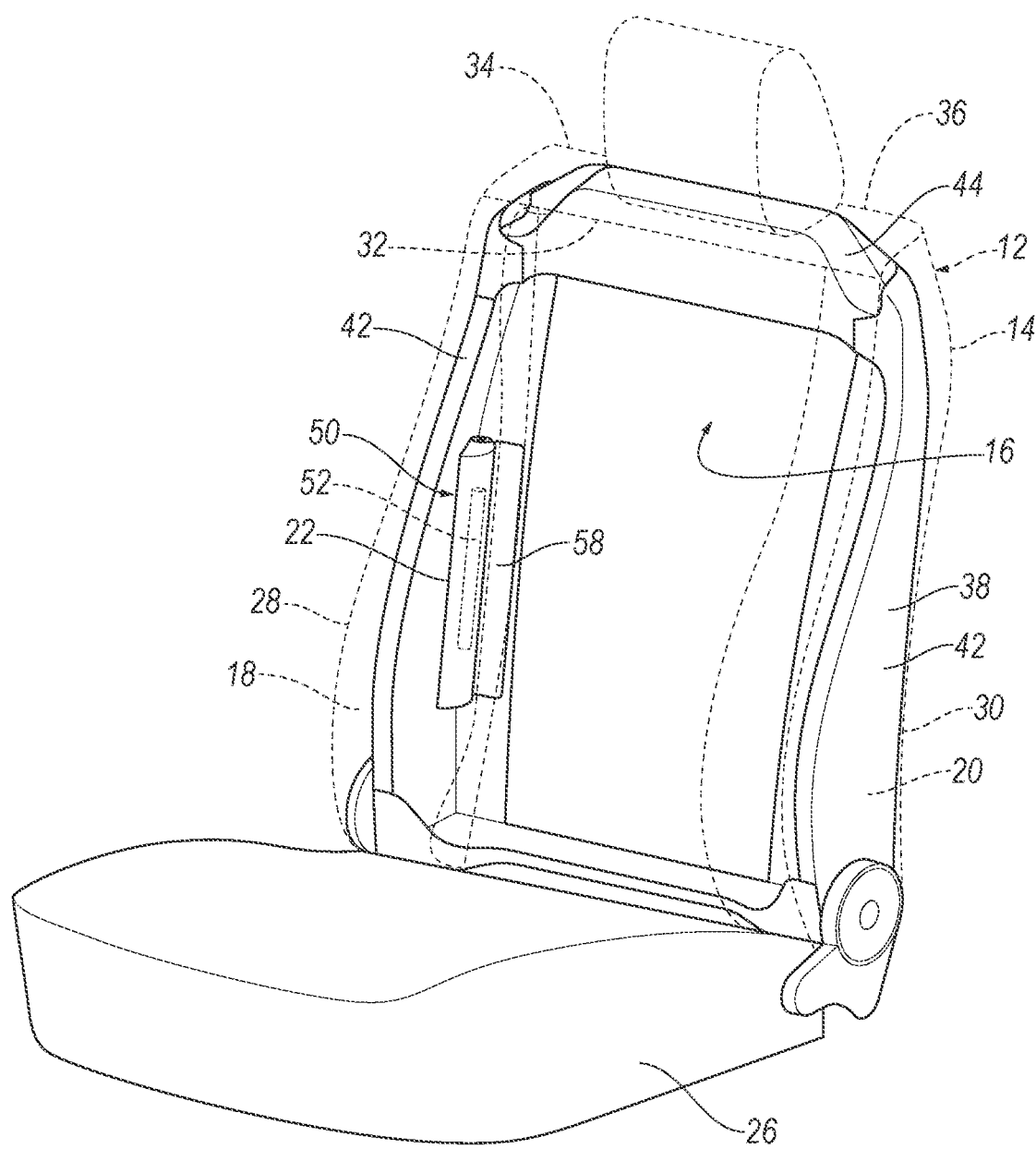
FIG. 4 is a perspective view of the vehicle seat with the arm assembly in the deployed position.

The inboard bolster 18 may be between the outboard bolster 20 and the middle console 46. With reference to FIGS. 2A-2B, the inboard bolster 18 is adjacent the middle console 46 when forward facing. In examples including the first vehicle seat 12 and the second vehicle seat 12, the middle console 46 is between the second vehicle seat 12 and the inboard bolster 18 of the first vehicle seat 12 when the first vehicle seat 12 and the second vehicle seat 12 are forward facing.

With reference to FIGS. 3-6, the vehicle 10 includes an arm assembly 50. The arm assembly 50 includes the arm 22 and an actuator 52. As set forth below, the arm 22 is rotatably supported by the inboard bolster 18 and, based on the detection of an occupant in the occupant seating area 16, the actuator 52 rotates the arm 22 toward the occupant seating area 16 in response to detection of certain vehicle impacts.

Figure 5:
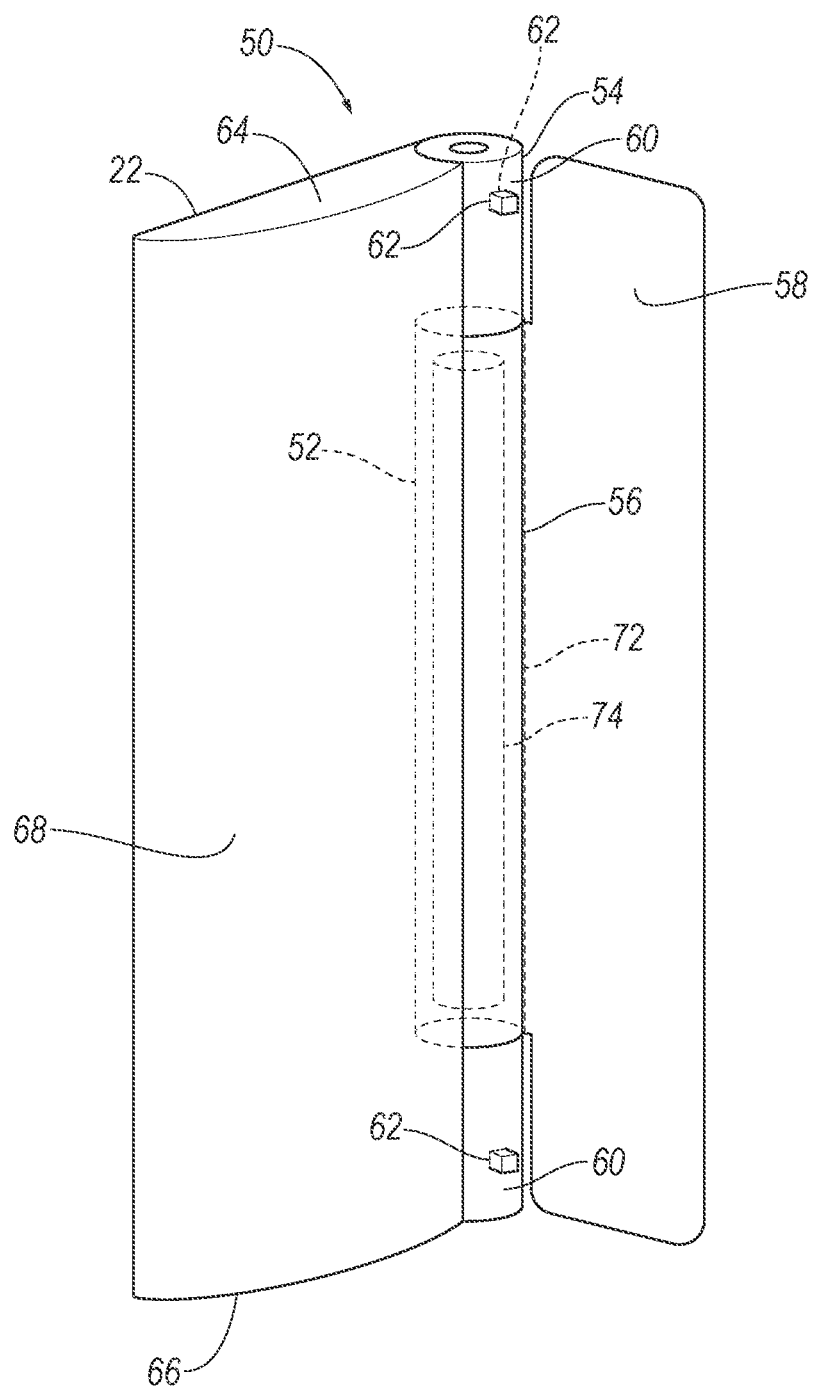
FIG. 5 is a perspective view of the arm assembly.
Figure 6A:
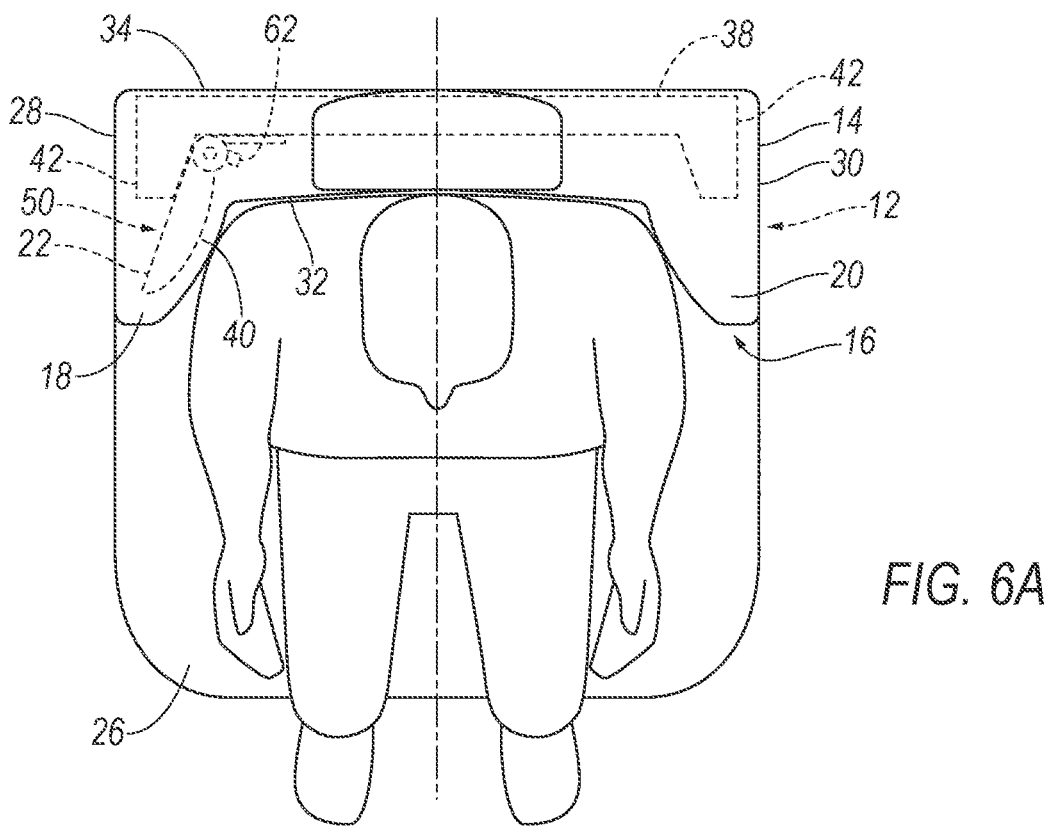
FIG. 6A is a top view of the vehicle seat with the arm assembly in the undeployed position.
Figure 6B:
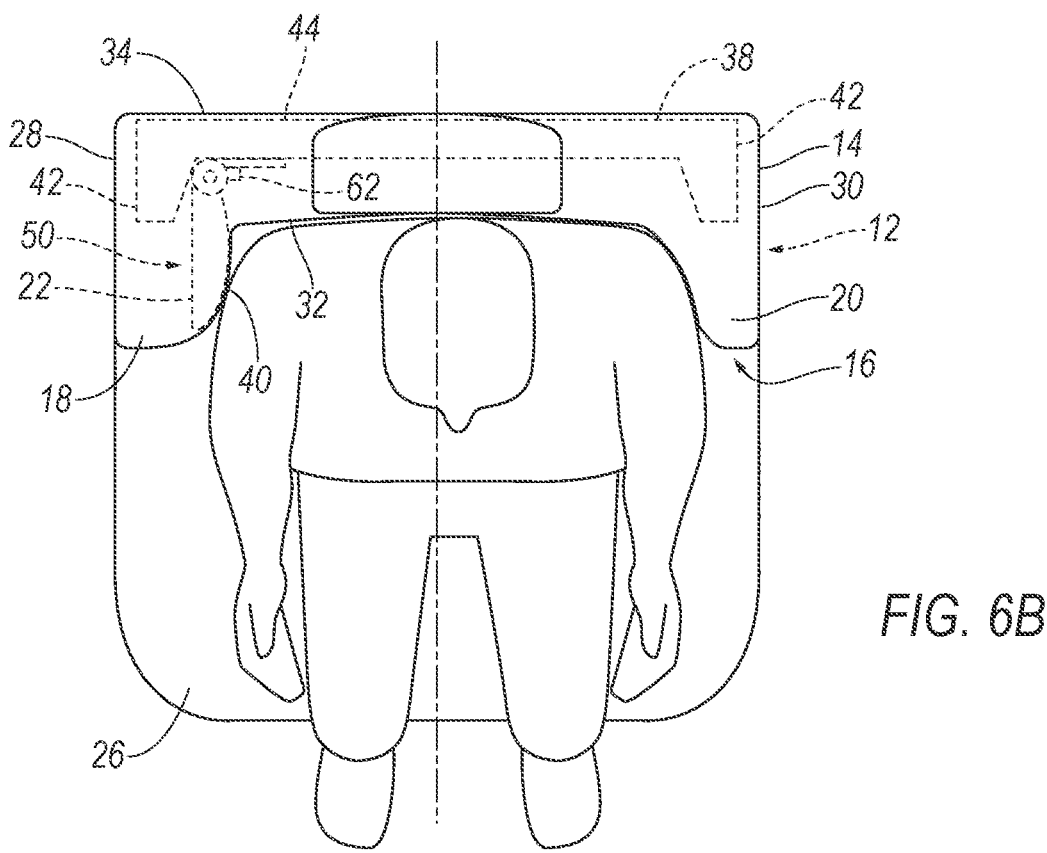
FIG. 6B is a top view of the vehicle seat with the arm assembly in the deployed position.

The arm 22 may be supported by the frame 38 between the frame 38 and the covering 40. Specifically, the arm 22 is rotatably supported by the inboard bolster 18. The arm 22 may be rotatable relative to the inboard bolster 18 toward the occupant seating area 16 about the upright axis A2 from the undeployed position to the deployed position. For example, the arm 22 may be rotatably supported by the inboard bolster 18 by a hinge 54 disposed between the arm 22 and the inboard bolster 18, as described further below. For example, as illustrated in FIG. 5, the actuator 52 may include a housing 56 having a base 58 mounted to the frame 38 and the hinge 54 may include bearing-ends 60 rotatably connected to the housing 56. As described further below, the actuator 52 rotates the bearing-ends 60 relative to the housing 56 to rotate the arm 22 relative to the housing 56 and the frame 38 from the undeployed position to the deployed position.

The hinge 54 may be configured to permit limited rotation of the arm 22 about the upright axis A2. Specifically, the hinge 54 stops the rotation of the arm 22 in the deployed position. For example, the hinge 54 may include a stop 62 that stops rotation of the arm 22 in the deployed position. The stop 62 is designed to stop rotation of the arm 22 relative to the inboard bolster 18 in the deployed position as the arm 22 rotates from the undeployed position to the deployed position. In the example shown in the Figures, specifically with reference to FIGS. 5-6B, the stop 62 protrudes from the bearing-end 60. The stop 62 is spaced from the base 58 of the actuator 52 in the undeployed position and abuts the base 58 of the actuator 52 in the deployed position.

The arm 22 may be supported by the frame 38. Specifically, the arm 22 may be supported by the upright frame member 42 of the inboard bolster 18. In other words, the weight of the arm 22 may be borne by the upright frame member 42. The arm 22 may extend in the seat-forward direction along the occupant seating area 16 in the undeployed position. In the example shown in the Figures, the arm 22 is between the frame 38 and the covering 40. Specifically, the covering 40 may conceal the arm 22, i.e., completely covering 40 the arm 22 to separate the arm 22 from the occupant seating area 16 and the passenger cabin. The arm 22 is between the frame 38 and the covering 40, e.g., concealed, in the undeployed position and may be between the frame 38 and the covering 40, e.g., concealed, in the deployed position, as shown in the example in the Figures. The arm 22 may move the covering 40 toward the occupant seating area 16 when the arm 22 rotates toward the occupant seating area 16. The arm 22 may be, for example, plastic such as acrylonitrile butadiene styrene (ABS), vinyl; metal; composite; etc.

With reference to FIGS. 2-5, the arm 22 includes a top edge 64 and a bottom edge 66. The top edge 64 faces the top of the seatback 14 and the bottom edge 66 faces the floor of the vehicle 10 when the vehicle seat 12 is in the upright position. The arm 22 may include two lateral sides 68 spaced from each other and each extending from the top edge 64 to the bottom edge 66. The arm 22 terminates at the top edge 64, the bottom edge 66, and the two lateral sides 68. As an example, the arm 22 may be crescent shaped in cross section. As another example, the arm 22 may be rectangular in cross-section. The arm 22 may be elongated from the top edge 64 to the bottom edge 66. Specifically, the arm 22 may be elongated along the upright axis A2, as shown in the example in the Figures. Specifically, the arm 22 may be elongated along the general upright position of the seatback 14. In the example shown in the Figures, the arm 22 is elongated along the inboard side 28 of the seatback 14. The arm 22 may have an inboard side 28 that faces the occupant seating area 16 when the vehicle seat 12 is in any position.

As set forth above, the arm assembly 50 may include the actuator 52 to deploy the arm 22 from the undeployed position to the deployed position. Specifically, the actuator 52 is activated by the computer 70 of the vehicle 10, e.g., a restraints control module, as described further below. In the example shown in the Figures, the actuator 52 rotates the arm 22 from the undeployed position to the deployed position. In other examples, in addition to or in the alternative to rotation, the actuator 52 may translate the arm 22 from the undeployed position to the deployed position.

As set forth above, the actuator 52 includes the housing 56. The housing 56 may include the base 58, as introduced above, and a barrel 72 supported by the base 58. The base 58 may be fixed to the frame 38, as described below, and the barrel 72 may be supported by the base 58 on the frame 38, i.e., the weight of the barrel 72 is borne by the base 58. The bearing-ends 60 of the hinge 54 may be rotatably engaged with the barrel 72 such that the bearing-ends 60 are rotatable relative to the barrel 72 from the undeployed position to the deployed position.

The actuator 52 is supported by the seatback 14. Specifically, the actuator 52 may be supported by the inboard bolster 18. As an example, shown in the Figures, the actuator 52 is fixed to the frame 38 of the inboard bolster 18. Specifically, in the example shown in the Figures, the actuator 52 is fixed to the upright frame member 42 of the inboard bolster 18. The actuator 52 moves as a unit with the frame 38 in the event the seatback 14 is adjusted relative to the seat bottom 26 between the upright position and reclined positions. As an example, the actuator 52 may be fixed to the upright frame member 42 with threaded fasteners, clips, brackets, etc.

The arm 22 is supported by the actuator 52. In other words, the weight of the arm 22 may be borne by the actuator 52. In the example shown in the Figures, the actuator 52 is rotatably coupled to the arm 22 to rotate the arm 22 along the upright axis from the undeployed position to the deployed position.

The actuator 52 may be engaged with the arm 22 and configured to rotate the arm 22 toward the occupant seating area 16. Specifically, the actuator 52 rotates the arm 22 about the upright axis from the undeployed position to the deployed position in response to detection of certain vehicle impacts, as described further below. As the arm 22 rotates into the occupant seating area 16, the arm 22 rotates toward the occupant of the seat. In some examples, the arm 22 may force covering 40 of the bolster 18, 20 to contact the occupant, i.e., an inboard side 28 of the occupant. In such an event, a seated occupant may be urged in the cross-seat direction toward the outboard bolster 20 in response to a certain vehicle impact. In examples including the middle console 46, a seated occupant may be urged in the cross-seat direction away from the middle console 46 in response to a certain vehicle impact.

The actuator 52 includes a driving mechanism 74 that imparts rotation on the arm 22. The driving mechanism 74 may be, for example, housed in the housing 56, and more specifically, in the barrel 72. In such an example the driving mechanism 74 is rotatably engaged with the hinge 54, e.g., the bearing-ends 60, to rotate the hinge 54 relative to the barrel 72. In other words, the actuator 52 is a rotary actuator 52.

As an example, the actuator 52 may be a pyrotechnic actuator 52. In other words, the actuator 52 is pyrotechnically actuated. Specifically, the driving mechanism 74 of the actuator 52 is a pyrotechnic device that includes a pyrotechnic charge (not shown). The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2). In such an example, the actuator 52, specifically the pyrotechnic device, includes a rotary cylinder and the pyrotechnic charge that rotates the rotary cylinder. When the actuator 52 is activated, as described below, the actuator 52 moves the arm 22 from the undeployed position to the deployed position. The pyrotechnic charge rotates the hinge 54 toward the occupant seating area 16, rotating the arm 22 from the undeployed position to the deployed position.

As another example, the actuator 52 may be motorized. In other words, the actuator 52 is a motorized actuator 52. In such an example, the driving mechanism 74 of the actuator 52 includes a motor, e.g., a DC motor, and may include gears. In such an example, the motor is activated to rotate the arm 22 relative to the frame 38, e.g., by imparting rotational force on the bearing-ends 60 of the hinge 54. In such an example, the actuator 52 may be resettable. In other words, the motor may move the arm 22 from the deployed position to the undeployed position to reset the actuator 52 for re-use.

Figure 7:
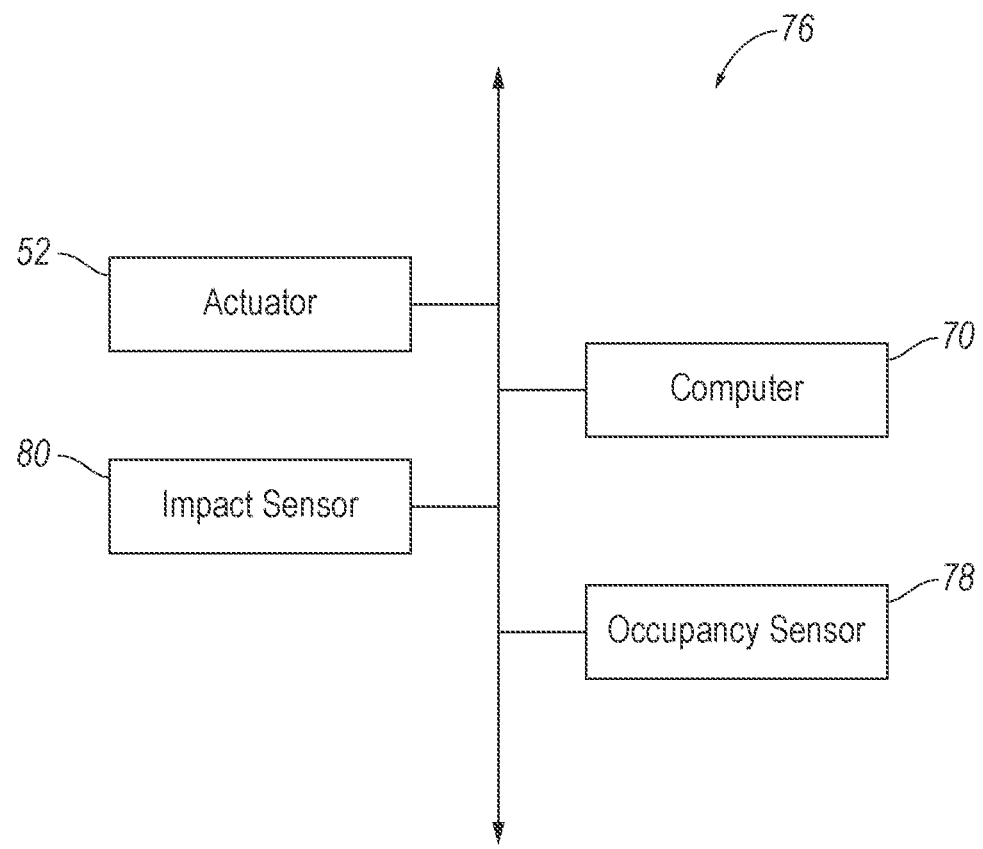
FIG. 7 is a schematic of a system of the vehicle.

With reference to FIG. 7, the vehicle 10 includes the computer 70 including a processor and a memory. The computer 70 may be a restraints control module. The memory includes one or more forms of computer readable media, and stores instructions executable by the computer 70 for performing various operations, including as disclosed herein and including, for example, method shown in FIG. 8 and described below. For example, the computer 70 may be a generic computer 70 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 70 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 70. The memory may be of any type, e.g., hard disk drives, solid state drives, servers, or any volatile or non-volatile media. The memory may store the collected data sent from the sensors. The memory may be a separate device from the computer 70, and the computer 70 may retrieve information stored by the memory via a network 76 in the vehicle 10, e.g., over a CAN bus, a wireless network, etc. Alternatively or additionally, the memory may be part of the computer 70, e.g., as a memory of the computer 70.

As shown in FIG. 7, the computer 70 is generally arranged for communications on the vehicle communication network 76 that may include a bus in the vehicle 10 such as a controller area network CAN or the like, and/or other wired and/or wireless mechanisms. Alternatively or additionally, in cases where the computer 70 includes a plurality of devices, the vehicle communication network 76 may be used for communications between devices represented as the computer 70 in this disclosure. Further, as mentioned below, various controllers and/or sensors may provide data to the computer 70 via the vehicle communication network 76.

The vehicle 10 may include at least one impact sensor 80 for sensing certain impact of the vehicle 10. The computer 70 is in communication with the impact sensor 80 and the actuators 52. The computer 70 may activate the actuator 52, e.g., provide an impulse to the pyrotechnic charge, a command to the motor, etc., when the impact sensor 80 senses certain impact of the vehicle 10. Alternatively, or additionally to sensing certain impacts, the impact sensor 80 may be configured to sense certain impact prior to impact, i.e., pre-impact sensing. The impact sensor 80 may be of any suitable type, for example, post contact sensors such as accelerometers, pressure sensors, and contact switches; and pre-impact sensors 80 such as radar, LIDAR, and vision sensing systems. The vision sensing systems may include one or more cameras, CCD image sensors, CMOS image sensors, etc. The impact sensor 80 may be located at numerous points in or on the vehicle 10.

The vehicle 10 may include at least one occupancy sensor 78. The occupancy sensor 78 configured to detect occupancy of the vehicle seats 12, e.g., detect an occupant in the occupant seating area 16. The occupancy sensor 78 may be visible-light or infrared cameras directed at the vehicle seat 12, weight sensors supported by the seat bottom 26, sensors detecting whether a seatbelt assembly for the seat is buckled, or other suitable sensors. The occupancy sensor 78 provides data to the computer 70 specifying whether the vehicle seat 12 is occupied or unoccupied.

Figure 8:
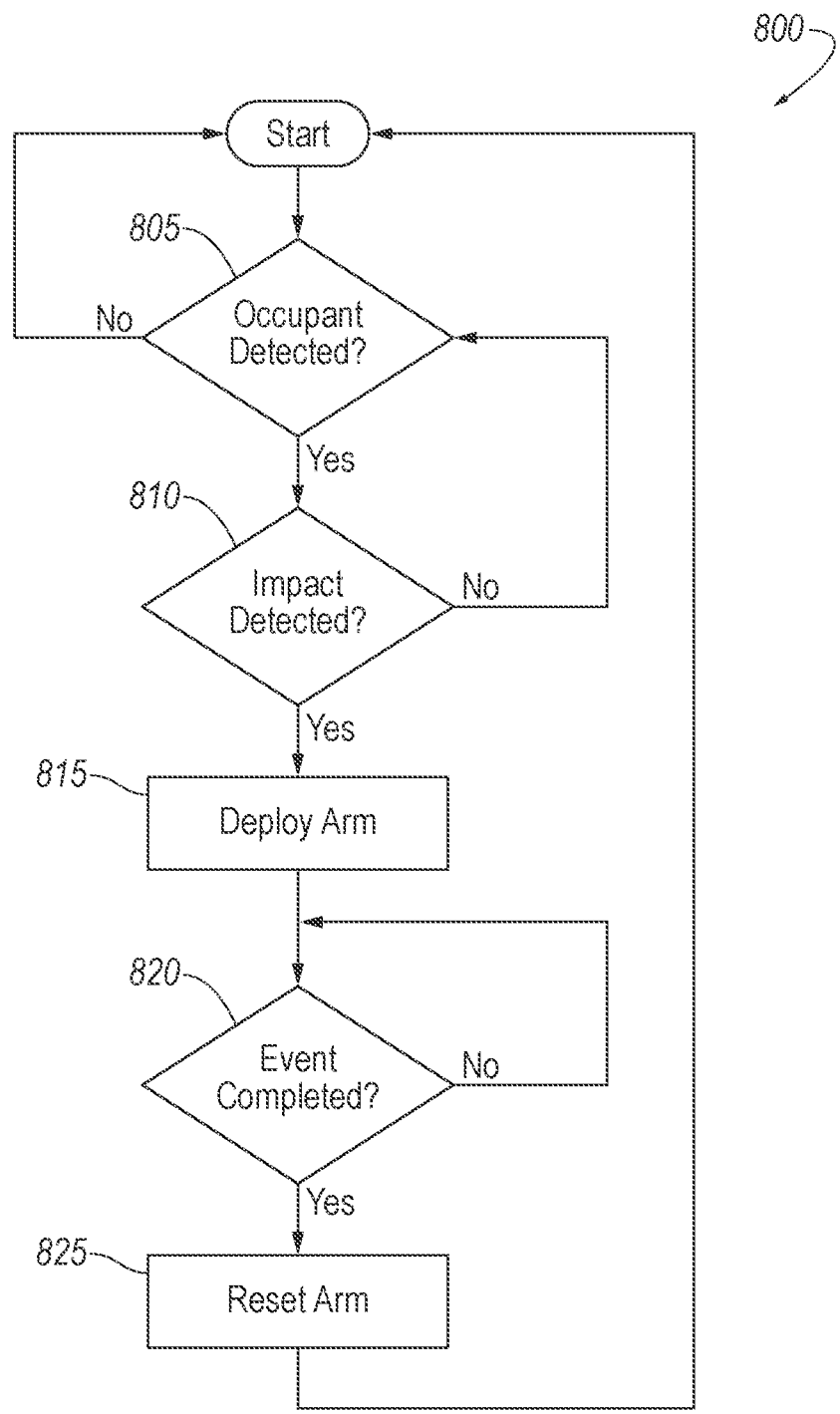
FIG. 8 is a flow chart of an example method.

With reference to FIG. 8, the vehicle computer 70 stores instructions to control components of the vehicle 10 according to the method 800 shown in FIG. 8. Use of "in response to," "based on," and "upon determining" herein indicates a causal relationship, not merely a temporal relationship.

With reference to block 805 of FIG. 8, the method includes detecting an occupant in the occupant seating area 16. Specifically, the occupancy sensor 78, as described above, may detect occupancy of the occupant in the occupancy seating area. In such an example, the occupancy sensor 78 communicates the detection of the occupant to the computer 70, e.g., by sending a signal over the network 76. In the event no occupant is detected, the method 800 returns to start. In the event an occupant is detected, the method 800 proceeds to block 810. In block 805, the method 800 may also include detecting an occupant in the occupant seating area 16 of the first vehicle seat 12 and/or the occupant seating area 16 of the second vehicle seat 12.

In block 810, the method includes detecting certain vehicle impacts. Specifically, the impact sensor 80, as described above, may detect certain vehicle impacts. In such an example, the occupancy sensor 78 communicates the detection of certain vehicle impacts to the computer 70, e.g., by sending a signal over the network. In the event a certain vehicle impact is not detected, the method 800 returns block 805 or to start. In the event an occupant is detected, the method 800 proceeds to block 815.

In block 815, based on the detection of an occupant in the occupant seating area 16, the method includes rotating the arm 22 toward the occupant seating area 16 in response to detection of certain vehicle impacts. In examples in which the method 800 includes detecting an occupant in the occupant seating area 16 of the first vehicle seat 12 and the second vehicle seat 12, block 815 includes rotating the arm 22 of the first vehicle seat 12 and/or the second vehicle seat 12 based on occupancy detection. In block 815, in examples in which the actuator 52 is a pyrotechnic actuator 52, block 815 includes the computer 70 providing an impulse to the pyrotechnic charge to rotate the arm 22 as described above. In examples in which the actuator 52 is a motorized actuator 52, block 815 includes the computer 70 providing a command to activate the motor to rotate the arm 22 as described above.

In examples in which the actuator 52 is resettable, the method 800 may include blocks 820 and 825. In block 820, the method 800 includes determining that the event that triggered deployment of the arm 22 is complete. This may be based, for example, on occupant input, service technician input, and/or sensor detection in the vehicle 10. When the event is complete, the method 800 proceeds to block 825 in which the actuator 52 is reset to the undeployed position. As an example, in examples in which the actuator 52 is a motorized actuator 52, block 825 includes the computer 70 providing a command to activate the motor to rotate the arm 22 from the deployed position to the undeployed position. When the arm 22 is in the undeployed position, the method 800 may return to start.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle seat including a seatback defining an occupant seating area;
the seatback including an inboard bolster and an outboard bolster spaced from the inboard bolster in a cross-seat direction with the occupant seating area between the inboard bolster and the outboard bolster;
an actuator supported by the inboard bolster, the actuator including a housing and a driving mechanism in the housing;
an arm rotatably supported by the housing of the actuator on the inboard bolster;
a hinge between the housing and the arm, the arm being rotatable about an axis of the hinge, and the actuator being configured to rotate the arm about the axis toward the occupant seating area, the axis of the hinge being on a rotational axis of the driving mechanism of the actuator;
the hinge including a stop designed to stop rotation of the arm relative to the inboard bolster in a deployed position as the arm rotates from an undeployed position to the deployed position;
the stop being spaced from the housing of the actuator in the undeployed position and abutting the housing of the actuator in the deployed position; and
a computer including a processor and a memory storing instructions executable by the processor to:
detect an occupant in the occupant seating area; and
based on the detection of an occupant in the occupant seating area, rotate the arm toward the occupant seating area in response to detection of certain vehicle impacts.

2. The vehicle of claim 1, wherein the inboard bolster is elongated along the axis and the arm is rotatable relative to the inboard bolster toward the occupant seating area about the axis.

3. The vehicle of claim 2, wherein the arm is elongated along the axis.

4. The vehicle of claim 1, wherein the actuator is a pyrotechnic actuator.

5. The vehicle of claim 1, wherein the inboard bolster includes a frame and a covering, the arm being supported by the frame between the frame and the covering.

6. The vehicle of claim 5, wherein the arm moves the covering toward the occupant seating area when the arm rotates toward the occupant seating area.

7. The vehicle of claim 1, wherein the inboard bolster is elongated along an upright axis and the arm is elongated along the upright axis.

8. The vehicle of claim 1, wherein the memory stores instructions executable by the processor to, based on the detection of an occupant in the occupant seating area, rotate the arm toward the occupant seating area in response to detection of certain far-side vehicle impacts.

9. The vehicle of claim 1, further comprising a middle console adjacent the vehicle seat, the inboard bolster being between the outboard bolster and the middle console.

10. The vehicle of claim 9, further comprising a second vehicle seat, the middle console being between the second vehicle seat and the inboard bolster.

11. The vehicle of claim 1, further comprising a second vehicle seat, the inboard bolster being between the outboard bolster and the second vehicle seat.

12. The vehicle of claim 1, further comprising:
- a second vehicle seat including a second vehicle seatback defining a second occupant seating area;
- the second vehicle seatback including a second inboard bolster and a second outboard bolster spaced from the second inboard bolster in a cross-seat direction of the second vehicle seat with the second occupant seating area between the second inboard bolster and the second outboard bolster;
- a second arm rotatably supported by the inboard bolster; and
- the memory storing instructions executable by the processor to:
  - detect an occupant in the second occupant seating area; and
  - based on the detection of an occupant in the second occupant seating area, rotate the second arm toward the second occupant seating area in response to detection of certain vehicle impacts.

13. The vehicle of claim 1, wherein the housing is mounted to a frame of the inboard bolster, and the hinge includes bearing-ends supported by and rotatably connected to the housing, the bearing-ends being rotatable relative to the housing by the actuator.

14. The vehicle of claim 13, wherein the stop protrudes from the bearing-end.

15. The vehicle of claim 13, wherein the arm is fixed to the bearing end and rotates with the bearing end as a unit about the axis of the hinge.

* * * * *